United States Patent
Yeh et al.

(10) Patent No.: US 6,687,373 B1
(45) Date of Patent: Feb. 3, 2004

(54) HEUSRISTICS FOR OPTIMUM BETA FACTOR AND FILTER ORDER DETERMINATION IN ECHO CANCELER SYSTEMS

(75) Inventors: Chiang Yeh, Arcadia, CA (US); Wei-Jei Song, Aliso Viejo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/379,698

(22) Filed: Aug. 24, 1999

(51) Int. Cl.$^7$ ................................. H04M 9/08
(52) U.S. Cl. .................. 379/406.08; 379/406.11; 370/290
(58) Field of Search ............... 379/406.08, 406.09, 379/406.1, 402, 93.01, 93.05, 93.07, 93.09, 93.11, 406.05, 406.11; 381/91, 94, 101, 103; 370/201, 286, 289, 290, 291

(56) References Cited

U.S. PATENT DOCUMENTS

| | | | |
|---|---|---|---|
| 5,473,686 A | * 12/1995 | Virdee | 379/410 |
| 5,631,899 A | 5/1997 | Duttweiler | 370/291 |
| 5,631,900 A | * 5/1997 | McCaslin et al. | 370/287 |
| 5,664,011 A | 9/1997 | Crochiere et al. | 379/410 |
| 5,687,229 A | 11/1997 | Sih | 379/410 |
| 5,757,906 A | 5/1998 | Unno | 379/410 |
| 5,764,753 A | * 6/1998 | McCaslin et al. | 379/389 |
| 5,805,696 A | 9/1998 | Im et al. | 379/411 |
| 5,812,537 A | 9/1998 | Betts et al. | 370/286 |
| 5,905,717 A | 5/1999 | Hasegawa | 370/289 |
| 5,923,749 A | 7/1999 | Gustafsson et al. | 379/410 |
| 5,933,797 A | 8/1999 | Haakansson et al. | 702/191 |
| 5,953,658 A | 9/1999 | Scott | 455/422 |
| 5,987,143 A | 11/1999 | Okuno et al. | 381/66 |
| 6,195,430 B1 | * 2/2001 | Eriksson et al. | 379/410 |
| 6,212,273 B1 | * 4/2001 | Hemkumar et al. | 379/410 |
| 6,282,176 B1 | * 8/2001 | Hemkumar | 370/276 |
| 6,434,110 B1 | * 8/2002 | Hemkumar | 370/201 |

* cited by examiner

*Primary Examiner*—Binh Tieu
(74) *Attorney, Agent, or Firm*—Blakely Sokoloff Taylor & Zafman LLP

(57) ABSTRACT

A method, apparatus and system employing such for adapting the Beta factor in a echo cancellation adaptive filter by using echo loss return enhancement (ERLE) as a metric to determine the setting of the Beta factor. In addition, a method and apparatus for determining the optimum number of filter taps used in an adaptive filter by dividing a filter array into blocks of taps, finding for each tap the sum of squares of the coefficients therein and then comparing the sum to an average block energy. Based on this comparison, a block is deemed to either contribute significantly to the operation of the filter or not. Starting with the tail end block of the array, the optimum filter order is found by determining when the first contributing block is found.

18 Claims, 6 Drawing Sheets

HEURSTICS FOR OPTIMUM BETA FACTOR AND FILTER ORDER DETERMINATION IN ECHO CANCELER SYSTEMS

BACKGROUND OF THE INVENTION

1. Field of the Invention

The invention relates generally to telecommunications. More specifically, the invention relates to echo cancellation in data, voice and other communication systems.

2. Description of the Related Art

The phenomenon of "echo" in telephone and voice carrier systems results from leakage back to the source of electrical signals as they approach their destination. Such echo is due to impedance mismatches between source and destination and/or reflections of the signals from components such as speakers. One classic occurrence of such echo is the "line echo" experienced in the conversion of four-wire systems (public networks) to two-wire systems (such as telephone wiring in a home).

For example, as shown in FIG. 1, two terminals 110 and 120, such as telephones, which subsist on two-wire networks connect to each other over a four-wire network 130. To facilitate the needed conversion, an analog device known as a hybrid is inserted between a four-wire network and the two-wire network. Thus, a hybrid 115 interconnects terminal 110 with the four-wire network 130 and a hybrid 125 interconnects terminal 120 with the four-wire network 130. Typically, hybrids 115 and 125 will consist of a pair of induction coupled transformers that a duplex signal into two simplex signals. Owing to the leakage current in each hybrid, a part of the signal energy that is transmitted will b reflected back to the source. Thus, terminal 110 would hear an echo of its own outgoing transmission (such as a voice echo) reflecting from its interception at hybrid 125 (which is attached to terminal 115).

To improve the quality of such transmissions, line echo cancellers are usually placed in the network. As shown in FIG. 2, a Line Echo Canceller (LEC) 200 is placed as close as possible to the source of the echo (in terms of the echo received by terminal 210) proximate to a hybrid 225. Terminal 210 sends a signal that is received as y(n), and serves as one input to LEC 200. A composite signal y(n) entering the network as a result of a terminal 220 (and its hybrid 225) is the sum of an echo "r(n)" of the x(n) signal and the transmitted signal t(n) from terminal 220. In a typical line echo canceller, such as LEC 200, an adaptive transversal FIR (Finite Impulse Response) filter is used to predict the echo based on previous samples. LEC 200, for instance, outputs an estimated echo signal r_est(n).

The filter is optimized by measuring and feeding back an error signal e(n)=y(n)-r_est(n). Based upon the goal of reducing the mean-squared error, the filter's coefficients are updated. One such updating scheme is known as LMS (Least Mean Square) which can be represented in discrete terms by:

$$a_k(i+1) = a_k(i) + 2\beta * \frac{1}{M} \sum_{m=0}^{M-1} e(i-,) * y(i-m-k),$$

where "M" is the number of discrete samples, "ak" is a coefficient of the filter.

One critical coefficient in the above formula is the Beta (β). The Beta is the loop gain factor that determines the convergence performance over time of the adaptive filter. The larger the Beta factor, in general, the more rapidly will the performance of the filter converge toward an optimum cancellation result. However, if the Beta is chosen too large then the filter performance may begin diverging at a certain point (FIG. 3(a)). A lower Beta may not converge until after a long time, as shown in FIG. 3(b), but will have less asymptotic error and thus, can be prevented from diverging off. Additionally, an input signal with a low power may cause slower convergence. In such a case the Beta factor can be normalized by the average power of the input signal converting the LMS algorithm into NLMS (Normalized Least Mean Square). Even with NLMS, the choice of Beta is difficult to resolve.

Thus, there is a need for a Beta discovery scheme that permits an adaptive filter to most optimally converge without risk of divergence or slowing due to low power in signals.

One other issue in the design of the filter is in choosing the number of taps used. When calculating the estimate of the echo signal, the filter coefficient at each tap is multiplied by the reference signal when the reference signal passes the tap. These products are accumulated together and represent the estimated echo. Therefore, the greater the number of taps, the more multiply-and-accumulate instructions need to be processed or implemented. This increases the cost and decreases the speed of the filter in estimating the echo and, consequently, in canceling Additionally, there is a need for determining the most optimal number of filter taps so that excess computation is reduced.

SUMMARY OF THE INVENTION

What is disclosed is a method, apparatus and system employing such for adapting the Beta factor in a echo cancellation adaptive filter by using echo loss return enhancement (ERLE) as a metric to determine how large or small the Beta should be set to. In general, a high ERLE indicates that a low Beta factor should be used, while a low ERLE indicates that a high Beta factor should be used.

Also disclosed is a method and apparatus for determining the optimum number of filter taps used in an adaptive filter by dividing a filter array into blocks of taps, finding for each tap the sum of squares of the coefficients therein and then comparing the sum to an average block energy. Based on this comparison, a block is deemed to either contribute significantly to the operation of the filter or not. Starting with the tail end block of the array, the optimum filter order is found by determining when the first contributing block is found.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both an operational act and an apparatus element for performing the act. Depending upon the implementation, the corresponding apparatus element may be configured in hardware, software (e.g., subroutines, a modules possibly acting in concert with other modules, etc.), firmware or combinations thereof.

Figure 1:
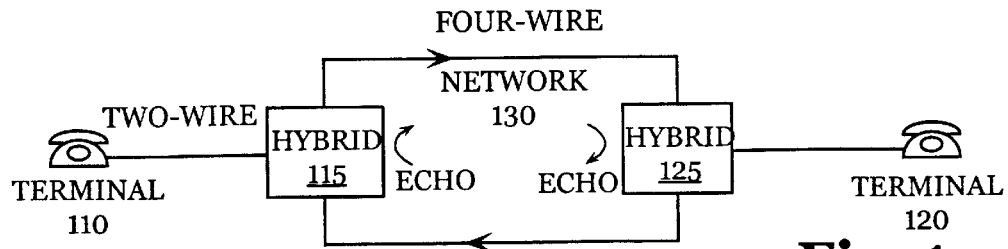
FIG. 1 shows a typical two-wire to four-wire network interconnection.
Figure 2:
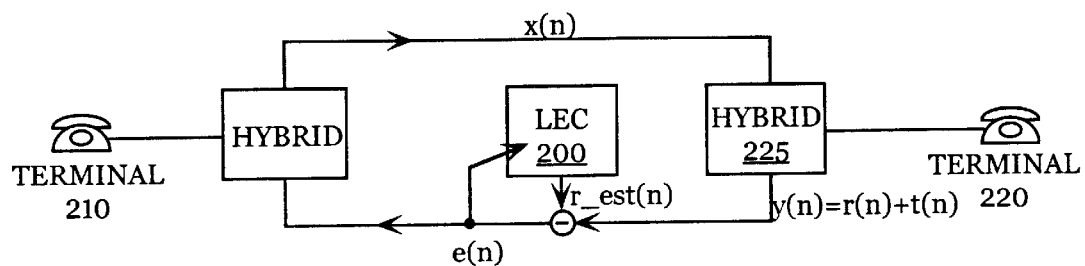
FIG. 2 shows a line echo canceller in a two-wire to four-wire network.
Figure 3A:
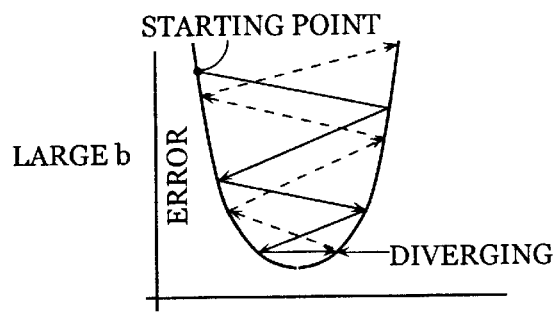
FIGS. 3(a) and 3(b) show the convergence and divergence of echo cancellation filter performance versus the Beta factor.
Figure 3B:
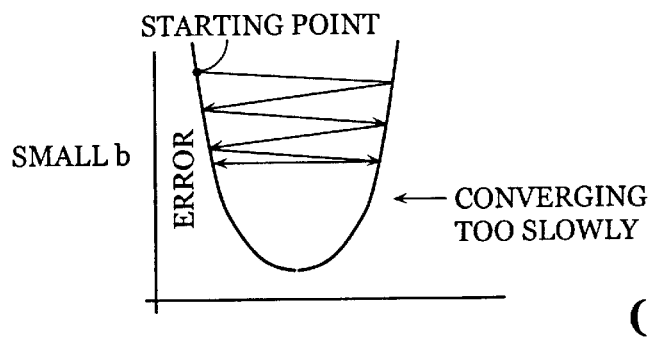
Figure 4:
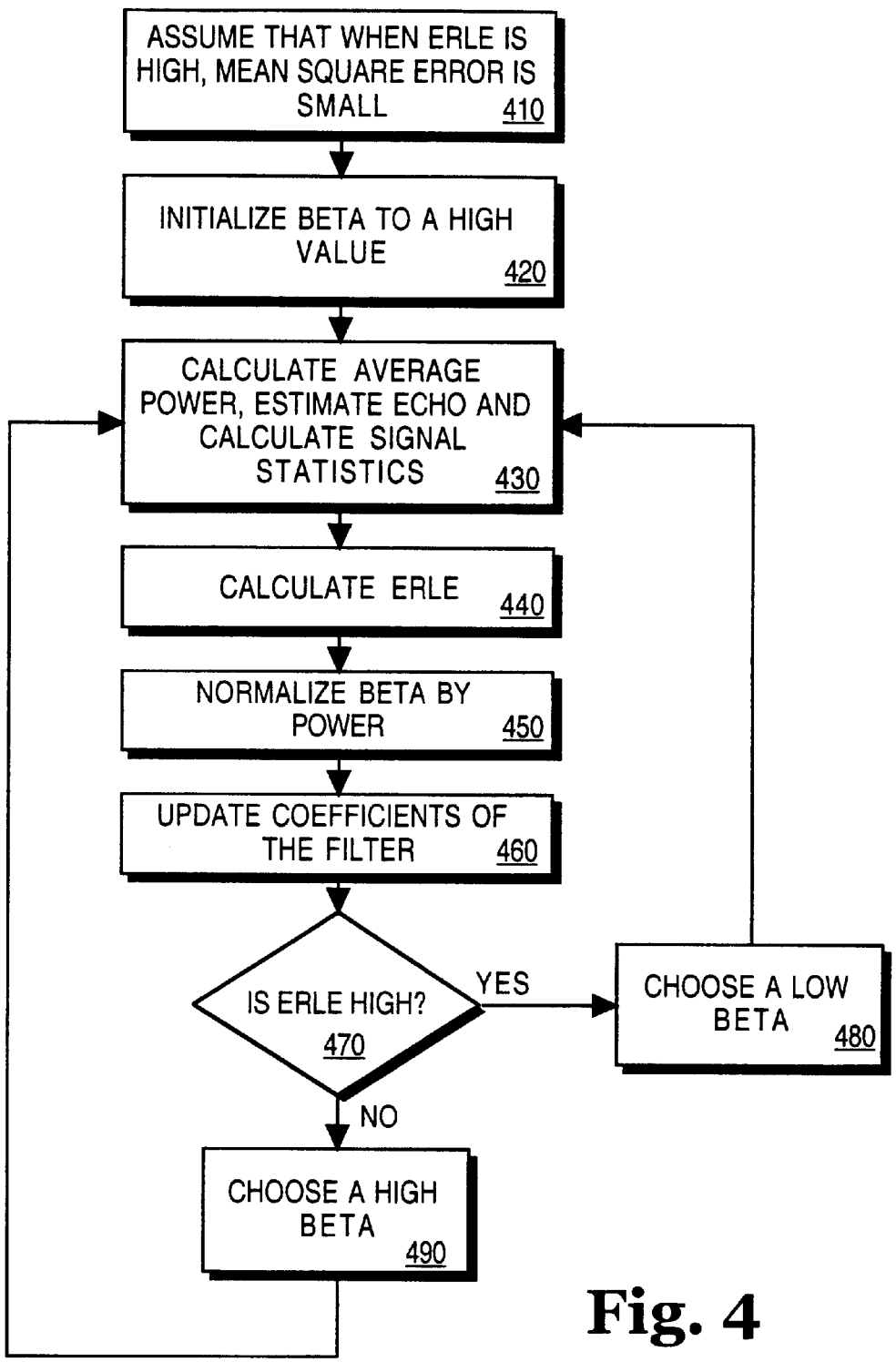
FIG. 4 is a flow diagram of Beta rate change adaptation according to an embodiment of the invention.

FIG. 4 is a flow diagram of Beta rate change adaptation according to an embodiment of the invention. The Beta factor (also referred to as the "step size") in LMS algorithms determines how quickly and if the performance of the filter converges to a point of minimal error. This was illustrated in FIGS. 3(a)–3(b). With too large a Beta, the performance may converge quickly but begin diverging at some point because the step size is too great. According to one embodiment of the invention, the Beta factor is adapted in accordance with a metric called Echo Return Loss Enhancement (ERLE). ERLE is a ratio measuring the attenuation of the echo in relation to the error. ERLE may be defined by:

$$\log(P(y)/P(e)),$$

where "P(y)" is the power of the return signal (which is assumed to contain no local talk component, and "P(e)" is the power of the error signal after attempted filter echo cancellation (see FIG. 5 description below).

FIG. 4 discusses one methodology for using ERLE to modify the value of Beta. First, the heuristic assumes that when ERLE is high, the mean square error is small, i.e. ERLE is inversely proportional to mean square error (block 410). The initial guess for a value is set to the high end of the range of Betas (block 420). Assuming that the transmitted and echo signals are available, a series of calculations are performed. The average power, estimate of the echo (based on the applying of the reference signal to the filter) and signal statistics such as co-variance are calculated (block 430). The ERLE is also calculated (block 440). The selected Beta factor is normalized, namely divided by the average transmitted signal power (block 450). The coefficients of the filter are then updated (block 460) in accordance with the LMS formula given above, but with a normalized Beta factor which is found by:

$$2\beta(i) = \frac{\beta_1}{P_y(i)},$$

where "$P_y(i)$" is the average power of the input signal.

The NLMS formula or coefficient updating becomes:

$$a_k(i+1) = a_k(i) + 2\frac{\beta}{P_y(i)} * \frac{1}{M}\sum_{m=0}^{M-1} e(i-m) * y(i-m-k).$$

The Beta factor (or step size) which controls the updating of coefficients and consequently, the performance of the filter is updated based upon the measured/calculated ERLE. If the ERLE is high (checked at block 470), then a low Beta is chosen (block 480). Otherwise, a high Beta is chosen (block 490). The definition of what constitutes a high/low ERLE and/or a low/high Beta may be derived by experimentation or statistical modeling. The table below represents one such possible ERLE/Beta selection and adjustment scheme:

| | |
|---|---|
| if ERLE < 40 | set Beta = $2^{-9}$ |
| if 39 < ERLE < 45 | set Beta = $2^{-10}$ |
| if 44 < ERLE < 50 | set Beta = $2^{-11}$ |
| if 49 < ERLE < 55 | set Beta = $2^{-12}$ |
| if 54 < ERLE < 60 | set Beta = $2^{-13}$ |
| If ERLE > 59 | set Beta = $2^{-14}$ |

Once a Beta, whether high or low, is chosen, the next sampling of signals are loaded and the process repeats from block 430 with the calculation of average powers, an estimate of echo and signal statistics.

Figure 5:
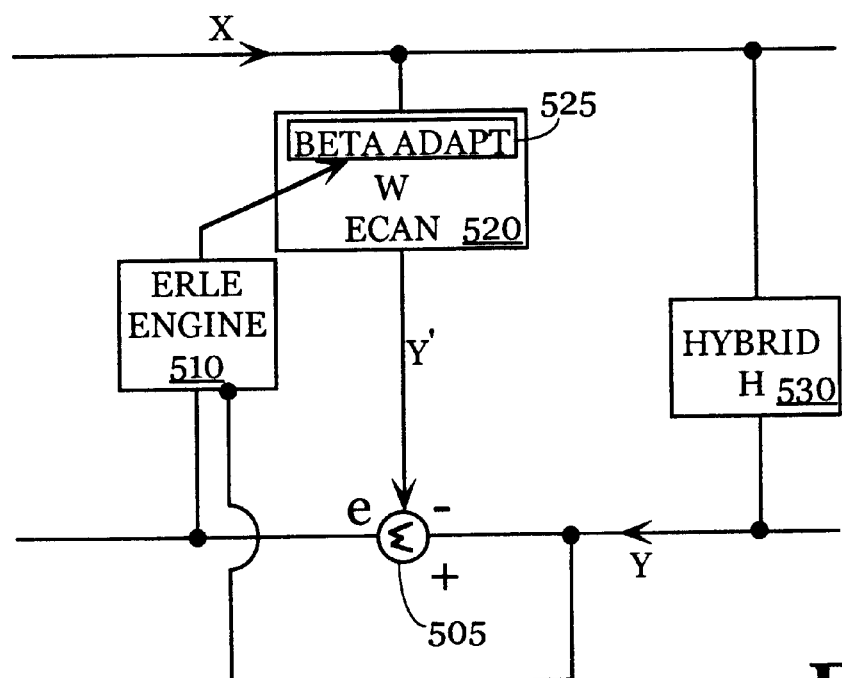
FIG. 5 illustrates an echo cancellation system employing Beta adaptation.

FIG. 5 illustrates an echo cancellation (ECAN) device 520 with a transversal adaptive filter array W and a Beta adapt module 525. A far end signal X, which is used as a reference signal for the filter array W, is received by a near end node which is coupled via a hybrid device 530. Hybrid 530 has a transfer function "H" which yields a signal Y that is transmitted out of the near end node to a far end node (not shown). Assuming that there is no local talk, i.e. no actually transmitted voice/data from the near end node to the far end node, the signal Y is purely echo resulting from the signal X being duplexed by hybrid 530. ECAN device 520 includes a differencing node 505 that subtracts an estimated echo Y' from the signal Y in an attempt to cancel the echo therein. The estimated echo is found by:

$$y_1 = \sum_{K=0}^{M-1} a_k * X(i-k).$$

An error signal (e) is the difference Y–Y' and should minimized in the mean square sense. An ERLE engine 510 calculates/measures the ERLE factor, which is governed by the ratio of $Y^2/e^2$. This ERLE is then used as a metric for determining what Beta should be chosen for the signals arriving in next sampling period. ERLE engine 510 sends its results to Beta Adapt module 525 within ECAN device 520: Beta adapt module 525 chooses the Beta in accordance with the ERLE, as shown in FIG. 4.

If the ERLE output signal (representative of the ERLE) falls in a particular range, a Beta will be chosen accordingly. In general, an increase in ERLE means a decreasing Beta is desirable. Beta adapt module 525, by controlling the Beta, will also control the updating of the filter tap coefficients. Advantageously, this modification is based upon a metric of the echo attenuation, namely, the ERLE factor. Another important issue is the choice of the number of taps to employ in the filter, whether or not the Beta factor for updating the tap coefficients is adapted as described above.

Figure 6:
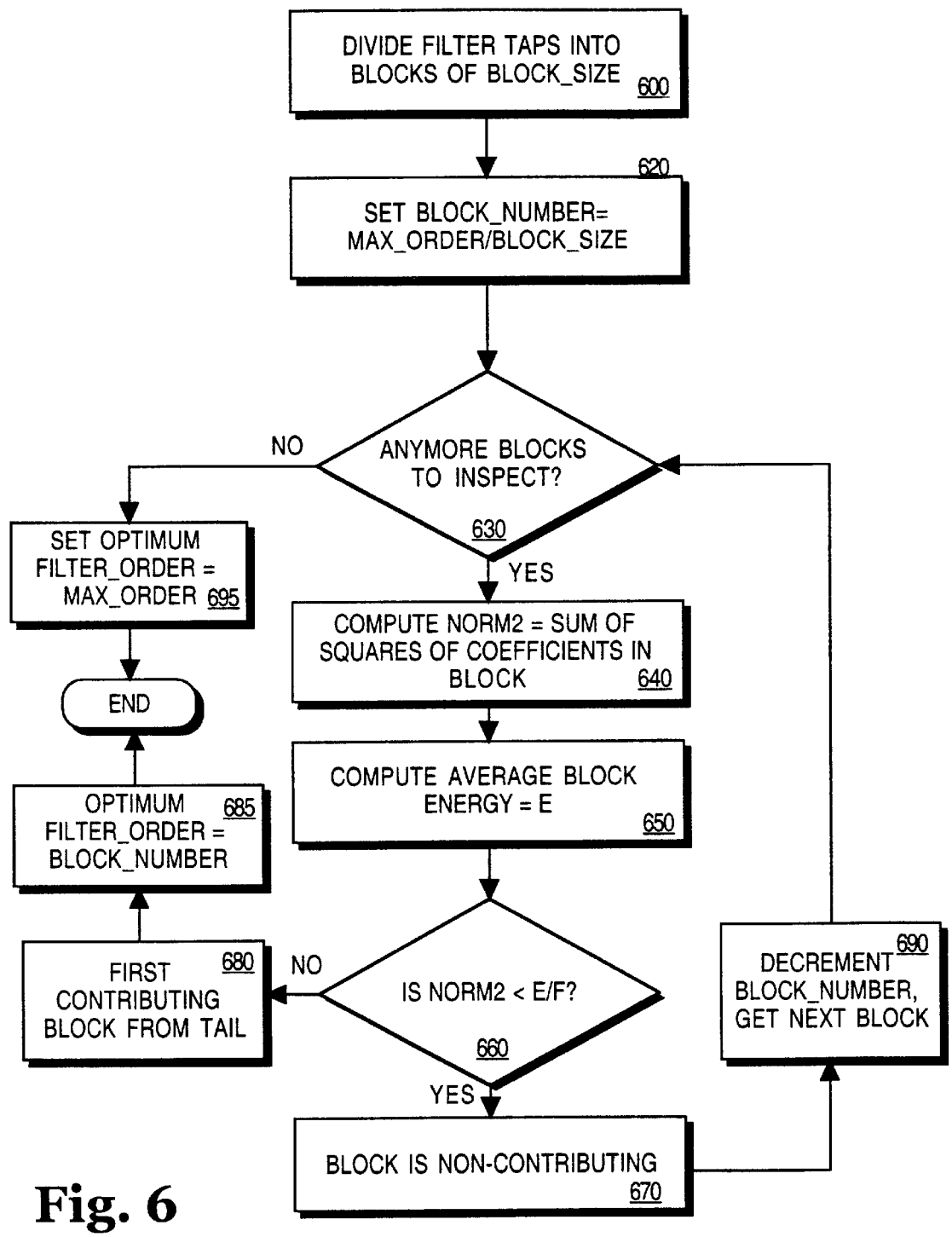
FIG. 6 is a flow diagram of optimum filter order determination.

FIG. 6 is a flow diagram of one embodiment of optimum filter order determination. In echo cancellation systems, a transversal filter (see FIG. 7) is employed as a means to generate an estimate of the echo potentially generated by a signal that is transformed in conjunction with it transmission (such as by a hybrid). The transversal filter is usually built with a fixed number of taps, typically on the order of 256 or 512. The number of taps determine how many historical signal samples (i.e., the delay of the reference signal) can be used in the echo estimation process. The hybrid characteristic "H" is time variant, but there is a statistical point at which historical samples are insignificant, particularly in signal samples that represent silence or null transmission. With a pre-defined fixed number of taps, these insignificant samples of the reference signal are often processed anyway, yielding an inefficient and slower responding delay cancellation. Though more taps are presumed to yield more accurate estimation, with fixed point math (where each number must be rounded to a fixed number of bits), more taps also yield greater quantization error. This quantization error is due to multiply-and-accumulate nature of the filter response, i.e., the more terms accumulated, the higher the potential error.

One way of eliminating insignificant samples and reducing quantization error is to disable or ignore the terms generated by certain filter taps. This heuristic assumes that given a maximum filter order M in a filter, only a subset N of those taps contributes significantly in the echo estimation. By reducing the number of taps, the filter order is reduced, and consequently, fewer coefficients need to be updated. The optimum filter order may be determined as described below.

First, the array of filter taps are divided in into blocks of a fixed number called BLOCK_SIZE (600). Since taps are often a power of 2, in one embodiment of the invention, BLOCK_SIZE is set equal to four. A variable BLOCK_NUMBER which tracks the number of the current block being inspected is initialed to the last block in the array which is equal to the maximum filter order (MAX_ORDER) divided by BLOCK_SIZE (620). The optimal filter order is determined starting from the tail end of the array rather from the beginning. By working backwards, following the pattern of a transversal filter, the blocks contributing the oldest historical data are ignored. To ensure good quality, only these tail end blocks are ignored.

If there are more blocks to inspect (e.g., BLOCK_NUMBER Δ0), then the block is tested as follows (630). First, a metric called NORM2, which is the sum of the squares of the filter tap coefficients within the block, is computed (640). NORM2 may thus be expressed by:

$$NORM2 = \sum_{K=R}^{R+BLOCK\_SIZE-1} a_k^2,$$

where $a_k$ is the coefficient of tap k, and R=BLOCK_NUMBER*BLOCK_SIZE.

Next, the average block energy (E) is computed, which can also be considered the average of NORM2 which is simply NORM2/BLOCK_SIZE (650). Then, NORM2 is compared with E divided by some fixed normalizing factor F (in one embodiment, F=256) (660), which in one embodiment of the invention is the same as MAX_ORDER. If NORM2 is less than E/F, then the inspected block as a whole is deemed non-contributing (670). The variable BLOCK_NUMBER is then decremented, and the next block (counting from the end of the array backwards) is fetched (690). The block inspection process then repeats (control goes back to 630).

If NORM2 is found to be greater than or equal to E/F, the first block deemed contributing counting from the tail end of the filter array has been found (680). The optimum filter order is set equal to the current BLOCK_NUMBER (685) which is the last contributing block (from the starting block forward) before subsequent blocks that are all non-contributing.

If no contributing blocks are found in the array (when traversed from the end) then the procedure is in error, so the optimum filter order is set to MAX_ORDER (695). The optimum filter order determination permits the filter to operate more efficiently and with less quantization error than if the entire filter is used. This is illustrated in FIG. 7.

Figure 7:
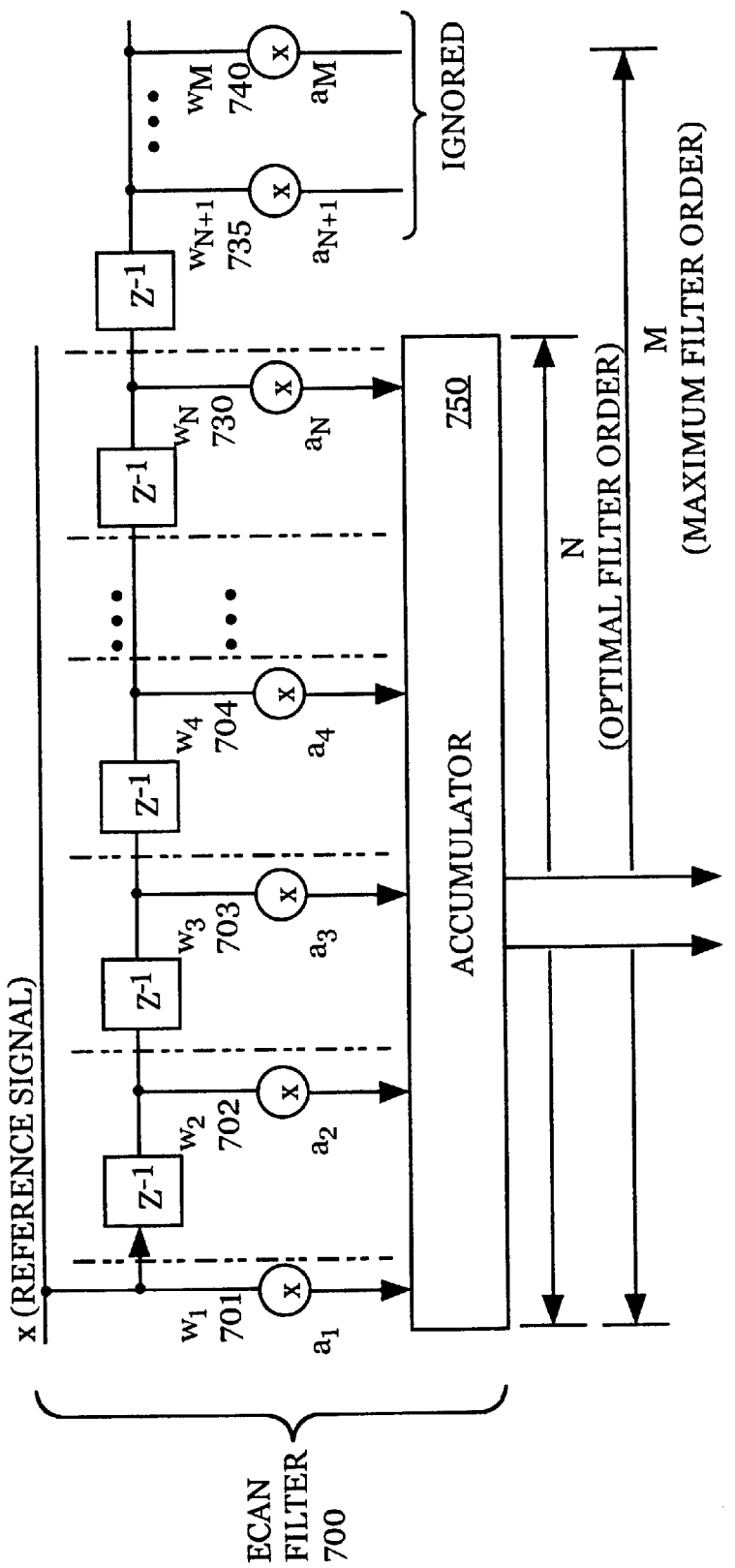
FIG. 7 illustrates the usage of optimum filter orders in a transversal adaptive filter.

FIG. 7 illustrates the usage of optimum filter orders in a transversal adaptive filter. For example, an ECAN (echo cancellation) filter 700 with a series of M taps $w_1$, 701, $w_2$ 702, $w_3$ 703, $w_4$ 704 ... $w_M$ 740 and corresponding coefficients $a_1$, $a_2$, $a_3$, $a_4$, $a_M$ is used. Each tap includes a propagation delay (represented by $Z^{-1}$) so that samples of signal over a period of time can be processed. A reference signal X is input at the starting end of the array. The filter operates on a multiply-and-accumulate principle. At each tap k, the signal X is multiplied by the tap coefficient $a_K$ and these products are then accumulated by accumulator 750. The resulting sum is an estimate of the echo produced by the reception of the reference signal. Of the M taps given, only a subset N of them bear any significance in estimating the echo according to the heuristic of one embodiment of the invention. By applying a comparison technique such as that described in FIG. 6, the taps can be marked as contributing or non-contributing significantly to the echo estimation.

Typically, an ECAN filter will use all M taps with which it has been outfitted. The echo estimate is then expressed by:

$$\text{echo estimate} = \sum_{K=1}^{M} a_k * X(i-k-1),$$

where "M" is the maximum filter order.

However, if an optimum filter order N can be discovered, then rather than multiplying and accumulating M values, and updating M filter coefficients, only N multiply-and-accumulate and N filter coefficient updates need to be performed. This can serve to improve the speed and efficiency of the ECAN filter as well as reduce quantization error inherent when the computations are performed in a fixed-point manner. Thus, the estimate of the echo, Y', becomes:

$$\sum_{k=1}^{N} a_k * X(i-k-1), \text{ where } N < M.$$

The taps $w_{N+1}$, ... $w_M$ and their associated coefficients $a_{N+1}$, ... $a_M$ are thus ignored and not even computed.

Figure 8:
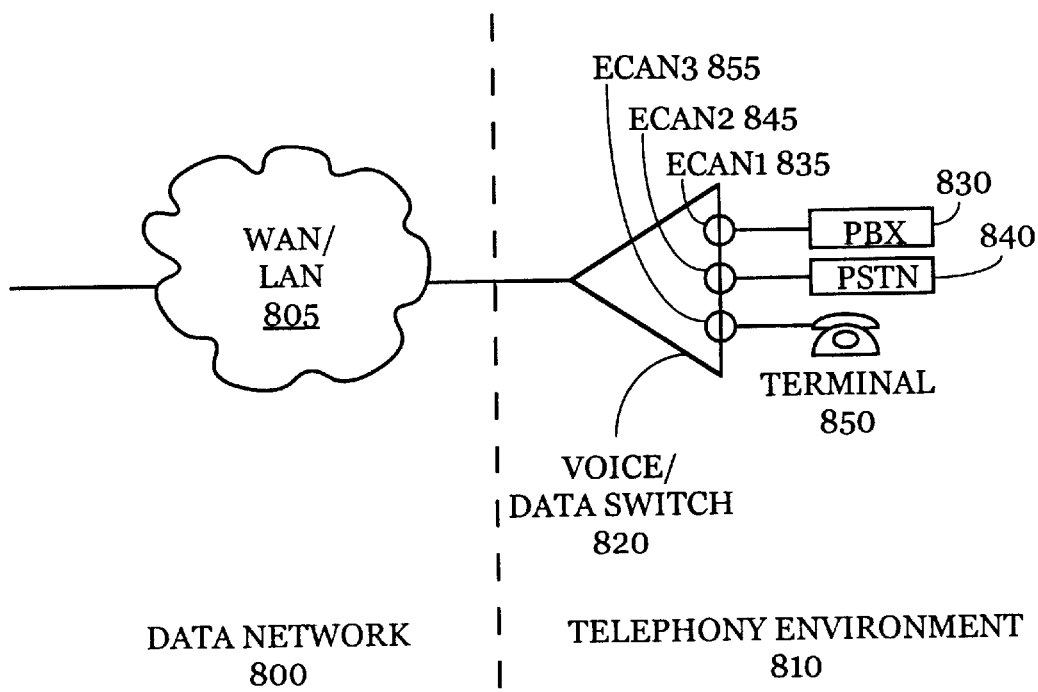
FIG. 8 is a system diagram of one or more embodiments of the invention.

FIG. 8 is a system diagram of one or more embodiments of the invention. Herein, echo cancellation (ECAN) filters are used in a variety of voice/data networking and communications systems. One example of this is the hybrid conjoining a four-wire and two-wire network. FIG. 8 shows one such system that employs a voice/data switch 820 (or multiple access unit (MAU)) serving as a transition point between a data network 800 and a telephony (voice) environment 810. Such switching is available in devices that attempt to multiplex voice and data together converting circuit switched data into packet switched or vice-a-versa. The telephony environment may connect to switch 820 a variety of devices or networks such as an end-user terminal 850 (e.g. telephone), a PBX 830 or a PSTN (Public Switched Telephone Network) 840. Each of these devices/networks is coupled to the switch 820 and interceding between are a series of ECAN devices. ECAN1 835 is coupled to PBX 830, ECAN2 845 is coupled to PSTN 840 and ECAN3 855 is coupled to terminal 850. Each of the ECAN devices (835, 845, 855) may have a different maximum filter order by design, but according to one embodiment of the invention, will have a optimum filter order determination engine, operating as described above. Further, since each of the ECANs are coupled to devices/networks that may show different characteristics, each has an appropriate Beta factor adapt module (as shown in FIG. 5) which adapts the Beta according to the ERLE of the echo due to the interconnection of the device/network with the data network 800. Data network 800 may be a WAN/LAN (Wide-Area Network/Local-Area Network) 805 or a general network of computer systems such as the Internet.

The network 800 (and the switch 820) and the telephony environment 810 may both be modeled as a hybrid such that echo cancellation may be employed at any point. In one embodiment of the invention Beta adaptive and optimum filter order echo cancellation devices may be included as part of the switch 820. By use of such ECANs, the voice and data multiplexing can be achieved with a better response, since the echo will be reduced quicker and more efficiently. Both the compute time of the filters and the convergence time of the error can be reduced by use of these mechanisms within each of the ECANs. Though not shown an ECAN device may also be employed at the junction where data/voice passes WAN/LAN 805 to voice/data switch 820. The Beta adapt modules and optimum filter order determination may be achieved in software, hardware, firmware or a combination of thereof, and may be distributed by a variety of means including computer-readable mediums.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method performed with a voice/data switch that modifies a Beta factor comprising:
   generating a signal value being an Echo Return Loss Enhancement (ERLE) value within the switch, the ERLE value is associated with a ratio between (i) a power level of an echo of a signal and (ii) a power level of an error signal, the error signal being a difference between an estimated echo of the signal and the echo of the signal; and
   adapting the Beta factor within the switch in response to modifications in the ERLE value the Beta factor being used to generate the estimated echo and to update coefficients of taps of the echo cancellation filter.

2. The method of claim 1, wherein the generation of the ERLE signal with a low ERLE value adapts the Beta factor with a high value.

3. The method of claim 1, wherein the generation of the ERLE signal with a high ERLE value adapts the Beta factor with a low value.

4. The method of claim 1, wherein the adaptation of the Beta factor includes ignoring non-contributing tail end taps associated with the echo cancellation filter based upon an energy level of the estimated echo generated by the taps.

5. An executable program having instructions embodied in a readable medium of a voice/data switch, the program comprising:
   a first module to produce an Echo Return Loss Enhancement (ERLE) value associated with a ratio between a power level of an echo of a signal and a power level of an error signal, the error signal being a difference between an estimated echo of the signal and the echo of the signal; and
   a second module to adapt the Beta factor in response to the ERLE value, the Beta factor to update coefficients of taps of an echo cancellation filter.

6. The program of claim 5, wherein the second module adapts the Beta factor inversely proportional to an adjustment of the ERLE signal.

7. The program of claim 5 further comprises a third module to ignore non-contributing tail end taps based upon the energy level of the estimated echo generated by the taps.

8. A switch for adapting between networks, the switch comprising:
   an array of filter taps, each tap having a coefficient, the coefficient multiplying itself with a sample of an input signal resulting in an echo estimate component; and
   a Beta factor adaptation module coupled to the array of filter taps, the Beta factor related to the updating of the coefficients, the Beta factor being modified in response to changes in an Echo Return Loss Enhancement (ERLE) signal, the ERLE signal related by the ratio of the power of the echo of the input signal to the power of an error signal, the error signal the difference between an estimated echo of the input signal and the echo of the input signal.

9. The switch according claim 8 wherein the mofiERLE signal possesses a low ERLE signal value when the Beta factor is adapted with a be a high.

10. The switch according claim 8 wherein an ERLE signal representing a high ERLE adapts the Beta factor to be low.

11. A system comprising:
    a first network coupled to a voice/data switch; and
    the voice/data switch coupled to the first network, the switch includes an echo cancellation filter, the filter including a Beta factor to govern an update of coefficients of the echo cancellation filter, the Beta factor adapted responsive to an Echo Return Loss Enhancement (ERLE) signal associated with a ratio of a power level of an echo of an input signal to a power level of an error signal being a difference between an estimated echo of the input signal and the echo of the input signal; and
    a second network coupled to the switch, the second network accepting the input signal from the switch to generate the echo of the input signal.

12. The system of claim 11 wherein the first network includes a data network.

13. The system of claim 12 wherein the second network includes a voice network.

14. The system of claim 12 wherein the switch interconnects multiple devices and networks to each other, each the interconnection having a Beta adaptive filter.

15. The system of claim 11 wherein the echo cancellation filter to ignore non-contributing tail end taps based upon the energy of the components of the estimated echo generated by the taps.

16. A switch to be adapted to a network, the switch comprising:

means for producing an Echo Return Loss Enhancement (ERLE) value being a ratio between (i) a power level of an echo of a signal and (ii) a power level of an error signal, the error signal being a difference between an estimated echo of the signal and the echo of the signal; and means for modifying a factor used to generate the estimated echo based on change in the ERLE value, the factor being decreased in response to an increase in the ERLE value and being increased in response to a decrease in the ERLE value.

17. The switch of claim 16, wherein the means for modifying further controls performance of a filter associated with an echo cancellation device.

18. the switch of claim 17, wherein the means for modifying controls the updating of filter tap coefficients of the filter.

\* \* \* \* \*